(12) United States Patent
Maloney

(10) Patent No.: US 6,730,396 B2
(45) Date of Patent: May 4, 2004

(54) ADHESIVE CONSTRUCTIONS; AND, METHODS

(75) Inventor: James M Maloney, Roseville, MN (US)

(73) Assignee: The Tapemark Company, West St. Paul, MN (US)

( * ) Notice: Subject to any disclaimer, the term of this patent is extended or adjusted under 35 U.S.C. 154(b) by 0 days.

(21) Appl. No.: 09/822,623

(22) Filed: Mar. 30, 2001

(65) Prior Publication Data

US 2002/0142156 A1 Oct. 3, 2002

(51) Int. Cl.⁷ .............................. B32B 15/04; C09J 7/02
(52) U.S. Cl. ...................... 428/343; 428/40.1; 428/43; 428/46
(58) Field of Search ................................ 428/343, 40.1, 428/43, 46

(56) References Cited

U.S. PATENT DOCUMENTS

| | | |
|---|---|---|
| 1,922,767 A | 8/1933 | Humphner |
| 2,030,135 A | 2/1936 | Carpenter |
| 2,095,437 A | 10/1937 | Fox |
| 2,109,583 A | 3/1938 | Bennett |
| 2,115,448 A | 4/1938 | Pradt |
| 2,142,194 A | 1/1939 | Karfiol |
| 2,191,704 A | 2/1940 | Bennett |
| 2,304,787 A | 12/1942 | Avery |
| 2,391,539 A | 12/1945 | Avery |
| 2,439,082 A | 4/1948 | Emmey et al. |
| 2,467,572 A | 4/1949 | Weisselberg |
| 2,760,715 A | 8/1956 | Sicking |
| 2,783,172 A | 2/1957 | Avery |
| 2,820,733 A | 1/1958 | Sorel |
| 2,880,539 A | 4/1959 | Frenkel et al. |
| RE25,675 E | 11/1964 | Du Bonnett |
| 3,398,439 A | 8/1968 | Fried et al. |
| 3,411,978 A | 11/1968 | Frohbach et al. |
| 3,547,337 A | 12/1970 | Pisarczuk |

(List continued on next page.)

FOREIGN PATENT DOCUMENTS

| | | |
|---|---|---|
| EP | 0 287 695 | 10/1988 |
| FR | 2 610 596 | 4/1988 |
| GB | 984443 | 2/1911 |
| GB | 1372615 | 10/1974 |
| WO | WO 93/02930 | 2/1993 |
| WO | WO 97/01488 | 1/1997 |
| WO | WO 98/38097 | 9/1998 |

*Primary Examiner*—Daniel Zirker
*Assistant Examiner*—Victor S. Chang
(74) *Attorney, Agent, or Firm*—Merchant & Gould P.C.

(57) ABSTRACT

Adhesive constructions are provided. In general, the adhesive constructions include first and second fields pressure sensitive adhesive. The amount of adhesive or coverage of adhesive in the two fields differs to advantage. A particular preferred adhesive construction is provided which includes a flexible substrate defining an outer perimeter edge and having on a side thereof an adhesive pattern which includes at least two adhesive fields, preferably arranged as: an outer perimeter adhesive field adjacent to the outer perimeter edge; and an inner adhesive field spaced from the outer perimeter edge and completely surrounded by the outer perimeter adhesive field. The preferred outer perimeter adhesive field is a discontinuous pattern of adhesive with adhesive covering no more than 80% of an area of a portion of the side of the flexible substrate defined by the outer perimeter adhesive field; and, the preferred inner adhesive field has adhesive covering at least 90% of an area of a portion of the side of the flexible substrate defined by the inner adhesive field, preferably in a continuous pattern. In typical preferred adhesive constructions, the inner adhesive field surrounds an adhesive-free region. Also provided are a preferred roll stock with such an adhesive construction secured to it, and preferred methods for constructing such arrangements.

6 Claims, 3 Drawing Sheets

U.S. PATENT DOCUMENTS

| | | |
|---|---|---|
| 3,725,188 A | 4/1973 | Kalt |
| 3,788,538 A | 1/1974 | Kuenzi |
| 3,822,492 A | 7/1974 | Crawley |
| 3,868,293 A | 2/1975 | Selph |
| 3,930,092 A | 12/1975 | Shapiro |
| 3,963,124 A | 6/1976 | Banks |
| 4,008,115 A | 2/1977 | Fairbanks et al. |
| 4,022,926 A | 5/1977 | Keough et al. |
| 4,028,474 A | 6/1977 | Martin |
| 4,056,661 A | 11/1977 | Sato et al. |
| 4,068,028 A | 1/1978 | Samonides |
| 4,214,024 A | 7/1980 | Jacobson |
| 4,244,125 A | 1/1981 | Corey |
| 4,253,899 A | 3/1981 | Takemoto et al. |
| 4,260,444 A | 4/1981 | Fowler |
| 4,281,762 A | 8/1981 | Hattemer |
| 4,285,754 A | 8/1981 | DiMatteo |
| 4,328,057 A | 5/1982 | Gutow |
| 4,359,183 A | 11/1982 | Aida et al. |
| 4,359,358 A | 11/1982 | Hattemer |
| 4,479,838 A | 10/1984 | Dunsirn et al. |
| 4,529,229 A | 7/1985 | Glibbery |
| 4,545,839 A | 10/1985 | Nakagawa |
| 4,550,048 A | 10/1985 | Nakagawa |
| 4,637,149 A | 1/1987 | Rivkin |
| 4,661,189 A | 4/1987 | Voy et al. |
| 4,696,843 A | 9/1987 | Schmidt |
| 4,711,237 A | 12/1987 | Kaiser |
| 4,728,380 A | 3/1988 | Jones et al. |
| 4,824,702 A | 4/1989 | Straub |
| 4,849,043 A | 7/1989 | Instance |
| RE33,616 E | 6/1991 | Welsch |
| 5,074,461 A | 12/1991 | Parker et al. |
| 5,098,759 A | 3/1992 | Felix |
| 5,351,426 A | 10/1994 | Voy et al. |
| 5,409,754 A * | 4/1995 | Yasuda et al. ............... 428/43 |
| 5,700,536 A * | 12/1997 | Steidinger .................. 428/40 |
| 5,727,728 A | 3/1998 | Sainz et al. |
| 5,738,381 A * | 4/1998 | Treleaven et al. ........... 283/81 |
| 5,803,347 A | 9/1998 | Sainz et al. |

* cited by examiner

ADHESIVE CONSTRUCTIONS; AND, METHODS

FIELD OF THE INVENTION

The present invention relates to adhesive constructions and methods for manufacturing and using such constructions. In preferred applications, the invention particularly concerns adhesive constructions from which a label, cover or other adhesive component, can be applied from a release liner, in an effective and convenient manner.

BACKGROUND OF THE INVENTION

In general, in many industries adhesive constructions are applied using high speed dispensing equipment, from a roll of individual constructions. The roll generally comprises individual elements in a line or column, adhered to a release liner, During an application process, the adhesive constructions or elements are sequentially stripped from the release liner and are applied to a package or other substrate on which such a construction is desired. Arrangements of this type are described, for example, in U.S. Pat. Nos. 5,351,426 and 4,661,189, the complete disclosures of which are incorporated herein by reference.

Adhesive constructions can be used in a variety of applications. For example, they may be used as labels or as covers. In other instances they may be used as components in larger systems, for example as a layer in a laminate.

SUMMARY OF THE INVENTION

An adhesive construction is provided. The adhesive construction involves a flexible substrate having a selected adhesive pattern, of pressure sensitive adhesive, on at least one side thereof. The selected adhesive pattern of pressure sensitive adhesive preferably includes at least a first adhesive field and a second adhesive field. In preferred constructions: the first adhesive field is a discontinuous pattern of adhesive with adhesive covering no more than 80% of an area of the portion of the first side of the flexible substrate defined by the first adhesive field, the area of that portion of the first side of the flexible substrate defined by the 80% adhesive field preferably being at least 10 square millimeters (sq. mm.), typically at least 30 sq. mm.; and, the second adhesive field preferably covers at least 80% (typically at least 90%) of an area of a portion of the first side of the flexible substrate defined by the second adhesive field; the area of the portion of the first side of the flexible substrate defined by the second adhesive field being at least 10 sq. mm., typically at least 30 sq. mm. Preferably there is more adhesive and more surface coverage, per unit area, in the second adhesive field than in the first adhesive field.

Adhesive constructions as defined herein may have still further adhesive fields thereon, as long as (preferably) the first and second adhesive fields are present.

In preferred adhesive constructions according to the present invention, the first and second portions of the selected adhesive pattern are preferably defined (respectively) by an outer perimeter adhesive field; and, an inner adhesive field. The preferred outer perimeter adhesive field is arranged along (or to border) a perimeter edge or edge portion of the flexible substrate. In such preferred embodiments, the inner adhesive field is completely surrounded or circumscribed by the outer perimeter adhesive field. In general, as described above, there is a higher amount of adhesive or higher coverage of flexible substrate surface by adhesive, in the region of the inner adhesive field, than in the region of the outer perimeter adhesive field. Preferred arrangements and amounts of coverage, are described.

In certain preferred arrangements, there is also provided an adhesive-free region on the flexible substrate. Preferably the adhesive-free region comprises an inner adhesive-free region completely surrounded or circumscribed by an inner (or second) adhesive field. In selected embodiments, the adhesive-free region is substantially transparent.

The adhesive construction will typically include, during a portion of its life prior to application to a package or other substrate, a release liner secured to the flexible substrate with the defined adhesive fields therebetween. The release liner generally would comprise a silicone release layer, to facilitate the separation of the release liner from the flexible substrate, during a labeling or covering operation, i.e., an application process, so that the flexible substrate could then be adhered to an appropriate package or other substrate.

Methods of preparing preferred adhesive constructions according to the present invention are provided. In general, the methods include: applying adhesive to create the different pressure sensitive adhesive fields defined; and, conducting appropriate die cutting and waste material stripping operations to achieve the generation of the individual adhesive constructions secured to a common release liner. In general, preferred die cutting operations will be conducted such that die cutting: is through a layer of laminate which will eventually become the flexible substrate of the adhesive construction; and, is in overlap only with adhesive in the first type of adhesive field, and thus in a pattern surrounding or circumscribing adhesive in the second type of adhesive field.

Preferred methods include applying adhesive to create a first, (for example outer perimeter) adhesive field and a second (for example inner) adhesive field by utilizing a printing approach, typically a dot screen printing approach, in which more adhesive is applied to the region that will become the second (inner) adhesive field than is applied to the region which will become the first (outer) perimeter adhesive field. This can be accomplished for example, by varying the number of dots or weight (wt.) of adhesive per unit area.

In typical manufacturing operations, a two layer laminate is prepared comprising two flexible webs secured to one another by adhesive. One of the flexible webs would comprise a release liner layer, and the other would comprise a flexible substrate web or layer that, when die cut, would form the flexible substrates of individual adhesive constructions for generation of the preferred constructions as characterized. The adhesive pattern between the two webs would typically have two regions: a region of adhesive in a concentration that, after a die cutting operation, would form the first (outer) perimeter adhesive field; and, a region of higher adhesive concentration which, after the die cutting operation, would form the second (inner) adhesive field. In preferred constructions, the adhesive fields of the laminate are organized such that during a die cutting operation, die cutting of the flexible substrate web only occurs in overlap with regions of lower adhesive concentration.

BRIEF DESCRIPTION OF THE DRAWINGS

FIG. 3 being taken of a side having thereon a transparent flexible web from which individual adhesive constructions will be die cut.

DETAILED DESCRIPTION OF THE PREFERRED EMBODIMENT

Figure 1:
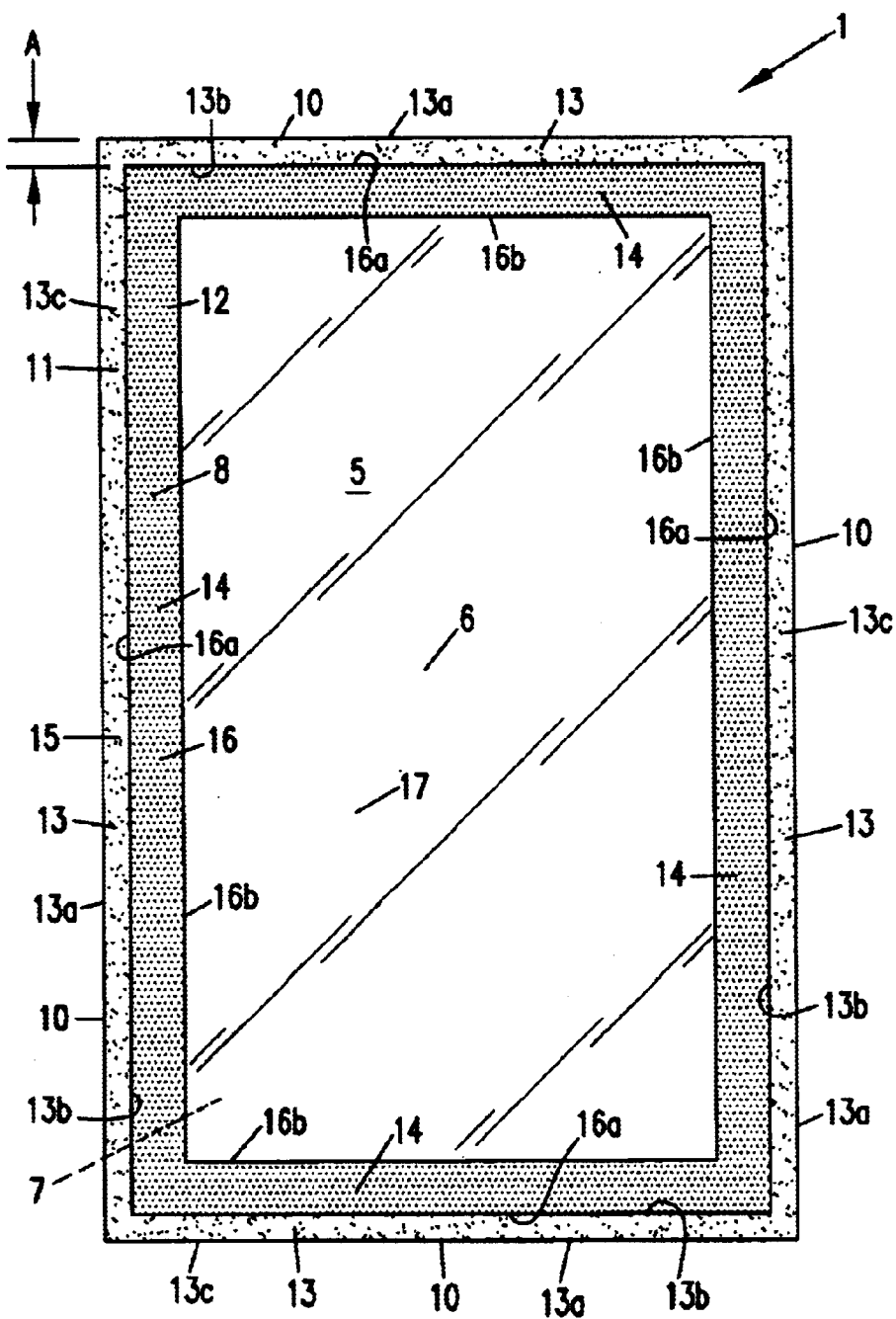
FIG. 1 is a schematic plan view of an adhesive construction according to the present invention; the view of FIG. 1 being toward a side having adhesive thereon.

Referring to FIG. 1, reference no. 1 depicts an adhesive construction according to the present invention. In general, adhesive constructions 1 according to the present invention may be applied to packages or other substrates, for example as labels, covers or other components, depending upon the particular application. When utilized as a label, typically printed matter or graphic matter will have been applied to the adhesive construction 1. The adhesive construction 1 would then be applied to a container or other substrate as a means of adhering the printed matter in place, as a label. When used as a cover, the adhesive construction 1 may or may not contain printing or graphics, but in general would be applied over a portion of a substrate for which coverage is desired. Such a portion of substrate may be, for example, an aperture or hole, i.e., window; or, it may be printing material or other material which is desired to have covered and protected. It is foreseen that in many preferred applications, adhesive constructions 1 according to the present invention will be applied as substantially transparent windows over an aperture or substrate, for example, over a hole in a package box. By "substantially transparent" in this context, it is meant that adequate light passes through the flexible substrate under normal viewing conditions, so that items can be readily viewed through the adhesive-free region of the flexible substrate. Of course, there is no requirement that the flexible substrate be substantially transparent, for many of the benefits of the present invention to be obtained.

As indicated above, the adhesive constructions may be used as other components and systems. For example, medical systems may involve use of such arrangements to adhere a component of a medical system in place. In addition, the arrangements may be utilized in shields or as components in laminates, or in other manners as components in mechanical or electrical systems.

Still referring to FIG. 1, the preferred adhesive construction 1 depicted comprises a transparent flexible substrate 5 having a first side 6 (facing the viewer) and an opposite second side 6 (directed away from the viewer). For the particular arrangement shown, the first side 6 has adhesive 8 applied thereto, as described below, for securing the adhesive construction 1 in place, during use. The opposite side 7 is typically adhesive-free, although such is not required for all applications. Side 6 will sometimes be referred to as the adhesive side of the substrate 5, or of the adhesive construction 1.

As indicated above, in general adhesive constructions according to the present invention are utilized by removal from a release liner and application to a package or other substrate. The adhesive construction 1, FIG. 1, is depicted after removal of the release liner.

In general, the materials selected will involve use of an adhesive 8 which is, typically, a pressure sensitive adhesive, i.e., secures upon contact and pressure. The material chosen for the flexible substrate 5 will generally be one which is adequately strong or tough to allow for the manipulations required during an application process, and to remain in place for the intended use. Some usable materials are characterized below.

Referring still to FIG. 1, the flexible substrate 5 of adhesive construction 1 generally defines an outer perimeter edge 10. For the particular adhesive construction 1 depicted, the outer perimeter edge 10 defines a quadrilateral shape, in particular a parallelogram. The particular adhesive construction 1 depicted is rectangular. It is noted, however, that principles according to the present invention can be utilized in accord with adhesive constructions having a variety of outer perimeter configurations, including for example those having irregular shapes, circular shapes, square shapes, triangular shapes, etc.

Still referring to FIG. 1, the adhesive construction 1 includes at least two different adhesive fields (or regions of adhesive) on the adhesive or first side 6. The two different adhesive fields 11, 12 comprise: a first adhesive field 11 and, a second adhesive field 12. It is noted that other adhesive fields different from adhesive fields 11 or 12 could also be provided in the arrangement 1, provided at least the first and second adhesive fields 11, 12, preferably as defined, are provided. In general, the first adhesive field 11 comprises an adhesive field defining an area of the substrate 5 on which there is no more than 80% coverage by the adhesive, preferably in a discontinuous pattern. Preferably the second adhesive field 12 is an adhesive field position to cover a selected area of the substrate, wherein there is at least 80% adhesive coverage, typically at least 90%, preferably at least 95%, and most preferably at least 99.5%. Most preferably the adhesive in the second adhesive field 12 is applied in a continuous pattern. Preferably the amount of adhesive coverage in the first field 11 is less than in the second field, in terms of wt. per unit area; and, preferably each of the first and second fields 11, 12 is in a pattern having a perimeter covering at least 10 sq. mm., typically at least 30 sq. mm., of the substrate 5.

While the characterizations in the previous paragraph are general, for adhesive fields according to the present invention, for the particular preferred arrangements depicted the first adhesive field 11 and the second adhesive field 12 are provided in preferred configurations, to achieve selected advantages. In particular, for the arrangement depicted in FIG. 1, the first adhesive field 11 comprises a perimeter adhesive field 13 and, the second adhesive field 12 comprises an internal adhesive field 14. In general, the preferred perimeter adhesive field 13 is configured with the following characteristics: it borders the outer perimeter 10 along at least one side and preferably entirely around the adhesive construction 1; and, it preferably completely surrounds or circumscribes the internal adhesive field 14. The particular preferred adhesive field 13 depicted, has the configuration of a rectangular frame 15 having a constant width and having, as its outside edge 13a, the outer perimeter 10, and having as its inside edge 13b, an interface or border with the internal adhesive field 14.

The particular, preferred, internal adhesive field 14 depicted, circumscribes or surrounds central region 17, in which there is no adhesive. That is, region 17 is, in preferred embodiments, adhesive-free. The particular preferred internal adhesive field 14 depicted is in the form of a rectangular frame 16 of constant width, having as its outer border 16a an interface or border with inner border 13b of adhesive field 13; and, having as its inner border 16b, a border surrounding an adhesive-free region described below. It is foreseen that internal fields 14 having a frame configuration 16 will be used in preferred embodiments, however, alternatives are applicable with principles according to the present invention.

Still referring to FIG. 1, a characteristic of the preferred perimeter adhesive field 13 is that within the field 13, adhesive coverage on the flexible substrate ranges between about 30% and 80% of the surface (or area) of the flexible substrate 5 covered or defined by the perimeter adhesive field 13. That is, at least 30% of the surface of the first side 6 of the flexible substrate 5, (in the region defined by borders 13a, 13b of the perimeter field 13) is covered by adhesive, and preferably not more than about 80% is so covered. Most preferably the coverage is no greater than 70%. Another characteristic of the preferred perimeter field is that it has a width, i.e., dimension of extension inwardly from the outer perimeter edge 10, indicated by dimension A, of at least 0.8 millimeters (mm.), and typically at least 1 mm. and up to 5 mm.

In preferred embodiments, the adhesive pattern in the perimeter adhesive field 13 is discontinuous. By "discontinuous" in this context, it is meant that the pattern comprises a plurality of spaced adhesive spots, islands or regions 13c, each of which is surrounded by adhesive-free region, as opposed to a continuous pattern in which there are no readily identifiable spaced spots, regions or islands of adhesive.

Another preferred characteristic of the perimeter field 13, is that immediately along the adhesive construction outer perimeter edge 10, the perimeter field 13 does not include an extension of more than 15 mm., preferably not more than 8 mm., and most preferably not more than 5 mm. without the edge 10 having intersected a region, spot or island of adhesive. That is, there is no substantial extension of edge 10, on surface 6, which is completely adhesive-free. Alternately stated, adhesive in the region of perimeter adhesive field 13 is applied in a discontinuous dot, spot or island pattern, with the dots (spots or islands) having been deformed or squished as a result of a laminate construction method used to prepare construction 1. Preferably, the dot pattern is such that the edge 10 encounters the adhesive dots or deformed dots (spots or islands) often enough so that along the edge there is no extension greater than about 15 mm., preferably not more than 8 mm., (most preferably not more than 5 mm. and typically less) over which an adhesive dot (spot or island) is not encountered or intersected.

In general, the typical arrangement of adhesive application will be applying the adhesive dots from a screen printing process. A typical such process would use about a 50 line screen (i.e. a screen of 50 lines per inch in each direction). Different adhesive patterns or amounts can be applied in different areas, by using an appropriate lacquer mask, in accord with typical screen printing techniques. A useable approach would be to provide a full tone print, where the second type of adhesive pattern is to be applied, and a half tone print (half as many dots per unit area) in a region to provide the first type of adhesive pattern. It is noted that alternate screens from 50 lines per inch can be adapted and used.

Still referring to FIG. 1, for the particular embodiment depicted, the internal field 14 is generally characterized by having a width inwardly from internal edge 13b of perimeter adhesive field 13, of at least 0.8 mm., typically at least 3 mm. and typically not more than 10 mm. Also, preferably, the internal adhesive field 14 is characterized by having a greater percentage of surface area having adhesive coverage, in the region defined by the second (internal) adhesive field 14, than is covered by adhesive in the region defined by the first (perimeter) adhesive field 13. Most preferably, the amount of adhesive coverage in the internal adhesive field 14 is at least 80%, preferably at least 90%, typically at least 95%. In typical preferred embodiments, the adhesive coverage in the internal adhesive field 14 is continuous. By the term "continuous" in this context, it is not meant that coverage is necessarily 100%, indeed the adhesive arrangement may have various fine pin holes in it. However, when the pattern is continuous the adhesive is not in isolated spots, islands or regions, and it typically covers greater than 99.5% of the surface area of the substrate 5 defined by the outer borders 16a, 16b of the internal adhesive field 14.

It is noted that a continuous adhesive pattern 14 can be formed by applying the adhesive in a discontinuous dot or printed pattern, by a process as characterized and then squeezing down the laminate to spread the dots into abutment with adjacent dots, thus forming a continuous pattern. This will be a typical preferred approach, as characterized below.

Another preferred characteristic of adhesive constructions according to the present invention, is that during manufacture, the total amount of adhesive applied in the region that will define the internal adhesive field 14 is at least 30% greater, per unit area, than is the total amount of adhesive applied to define the perimeter adhesive field, per unit area. Most preferably, the amount of adhesive application in the internal adhesive field on a per unit area basis is about 1.5 to 5 times the amount of adhesive applied in the region that will become the outer perimeter adhesive field to the perimeter adhesive field, on a per unit area basis; typically 1.5–2.5 times. (The ratio for full tone versus half tone, of course, would be 2:1).

Thus far the term "adhesive construction" has been used to characterize a construction comprising a flexible substrate as characterized, with adhesive fields characterized thereon. It is noted that in some instances herein, the term "adhesive construction" will be utilized to refer to such an arrangement with attached thereto a release liner, which can be stripped from the remainder of the adhesive construction, so that a resulting adhesive construction comprising a flexible substrate and adhesive, without a release liner can be applied for use.

Figure 2:
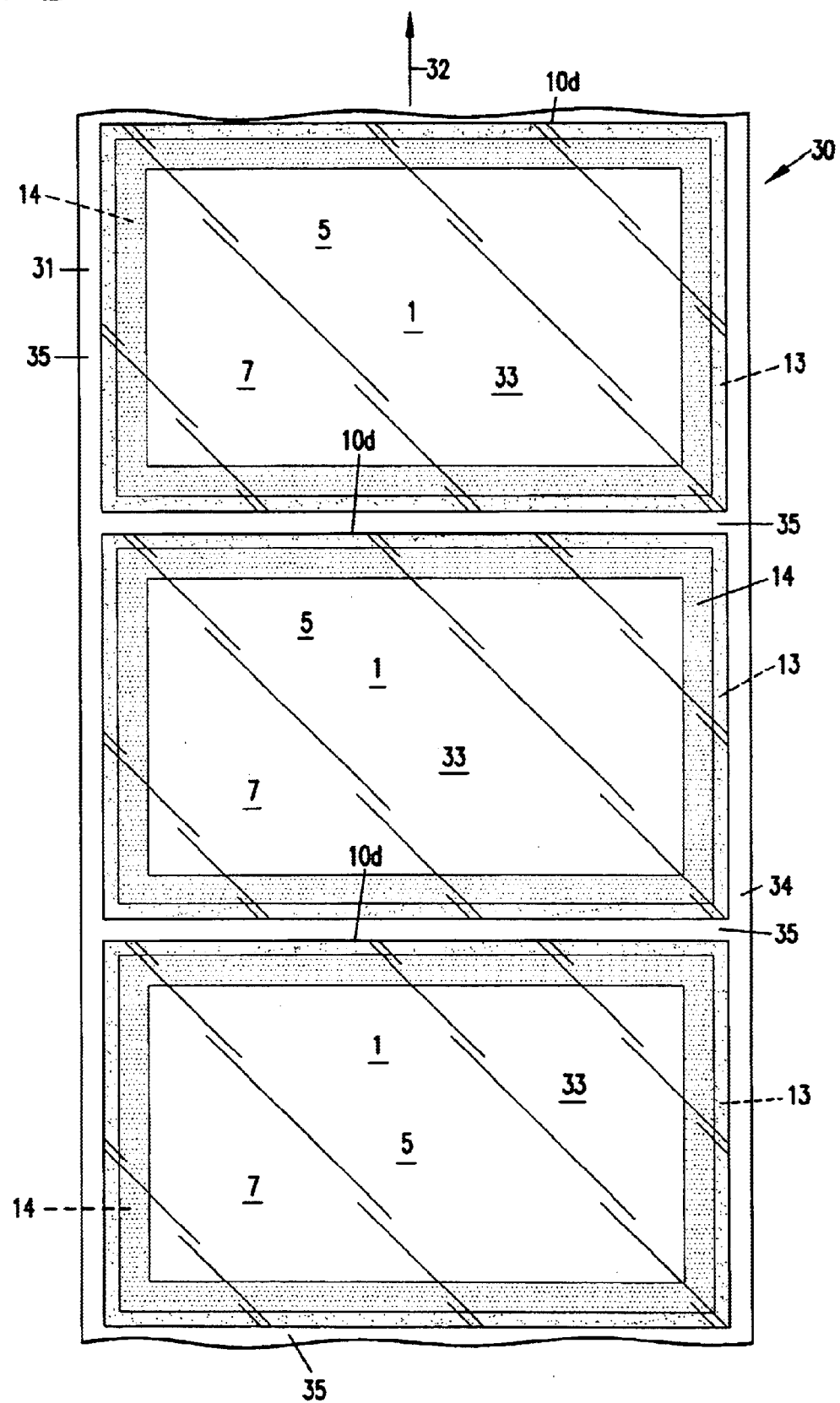
FIG. 2 is a schematic, fragmentary, plan view of a continuous roll of adhesive constructions in accord with FIG. 1 secured to release liner; the roll of FIG. 2 being useable in a process to apply adhesive constructions according to FIG. 1 to various substrates.

Attention is now directed to FIG. 2. In FIG. 2, there is depicted an adhesive construction 30, according to the present invention in the form of a roll for delivery of individual adhesive constructions 1. Machine direction for application is shown by arrow 32. The roll construction 30 comprises a continuous strip 31 having secured thereto, in a line, a plurality of spaced covers 33. The covers 33 may be generally in accord with adhesive constructions 1, and are positioned on the continuous strip 31 with the adhesive side 6 (FIG. 1) of each construction 1 directed against strip 31 and the non-adhesive side 7 facing the viewer.

For the particular preferred arrangement 30 depicted in FIG. 2, the individual adhesive constructions 1 each comprise a transparent substrate 5, so that adhesive fields 13 and 14 are viewable.

The continuous strip 31 preferably comprises a release liner 34, for example a silicone coated paper, from which the individual adhesive constructions 1 can be readily removed in a commercial labeling or application process; the silicone coating being at least on the side facing the covers 33. Since each of the constructions 1 has a first (perimeter) adhesive field 13 in accord with the preferred description for adhesive construction 1, stripping of the individual constructions 1 from roll construction 30 in a high speed application process is facilitated. This is in part because the low coverage of adhesive in first (perimeter) field 13 helps the lead edge 10d of each adhesive construction 1 to be started to separate from the continuous strip 31 of release liner. Unlike the arrangements of U.S. Pat. Nos. 5,351,426 and 4,661,189, in which there is no adhesive along the outer perimeter edge, the presence of at least 30% adhesive coverage in the perimeter field 13 facilitates operation by allowing for greater control and label application; and, after the construction 1 is applied to a package or other substrate, perimeter field 13 facilitates the label being retained in place and not inadvertently lifted and separated from the substrate to which the construction 1 has been applied. This latter advantage, inhibition of unintended or undesired separation from the substrate, is an important advantage of arrangements according to the present invention which utilize a perimeter field 13 as the first adhesive field.

Still referring to FIG. 2, it is noted that regions 35 on the release liner 34, between and around individual adhesive constructions 1, are generally adhesive-free. This results from a manufacturing operation in which any adhesive in these regions is stripped from the arrangement, as the roll construction 30 is formed.

Herein, the term "continuous" when used in reference to label roll construction 30 is generally meant to a strip 31 which is sufficiently long to include at least ten individual adhesive constructions 1 thereon, typically oriented in a single column or row. It is noted that typically a roll construction 30 will comprise at least 100 to 500 meters of continuous strip 31, with at least 1,000 to 5,000 individual constructions 1 in a row thereon. In some instances the roll construction 30 will include more than one row or line of constructions 1 thereon.

Figure 3:
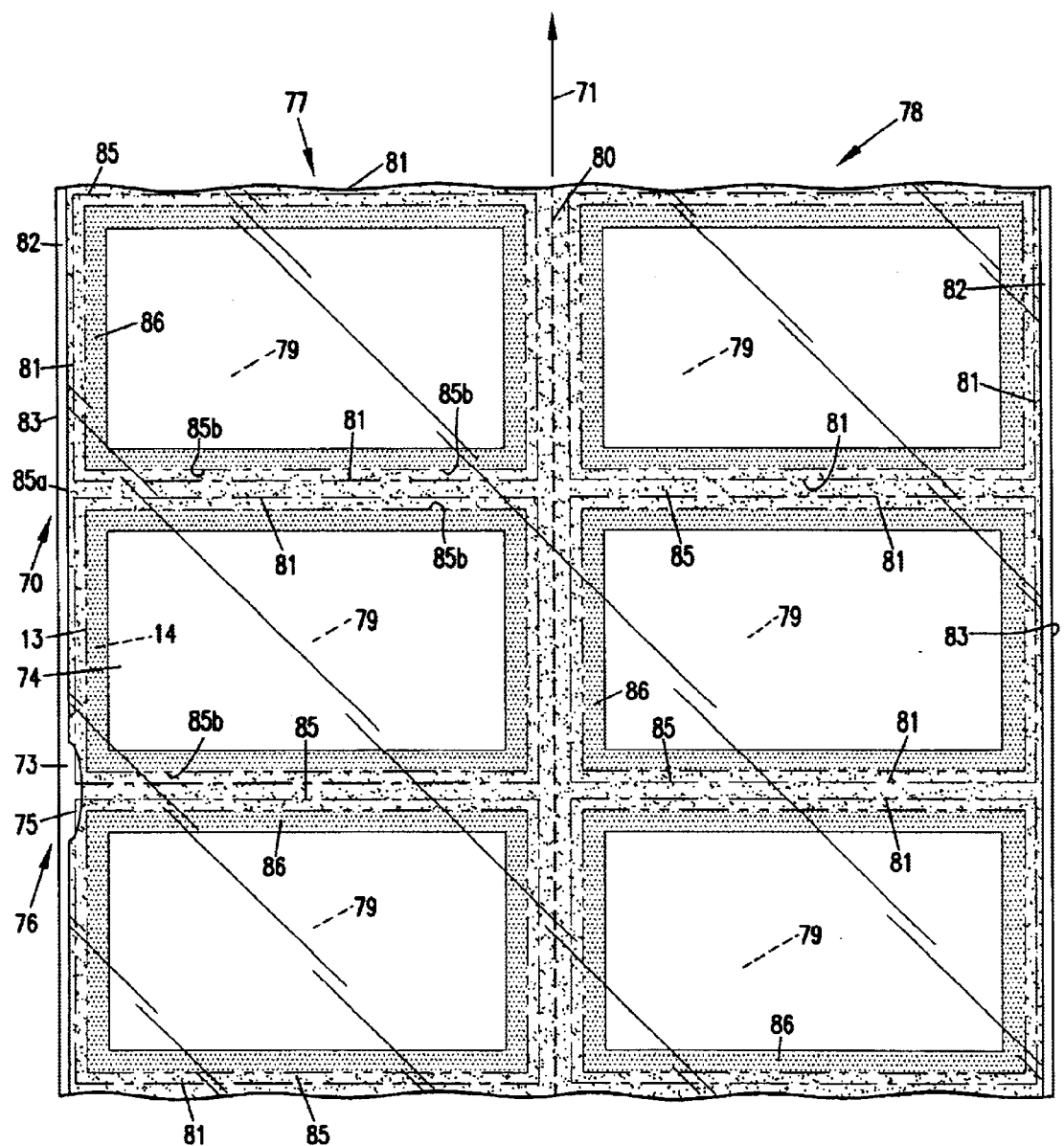
FIG. 3 is a schematic, fragmentary, plan view of a laminate roll stock from which a continuous roll in accord with FIG. 2 can be prepared.

Attention is now directed to FIG. 3. In FIG. 3, a roll stock 70 is shown, from which roll constructions 30, FIG. 2, in accord with the present invention can be made, the machine direction for manufacture being shown by arrow 71. In general, the roll stock 70 comprises a laminate of two flexible webs 73 and 74 with adhesive 75 positioned therebetween. The adhesive 75 is provided in a preferred pattern as characterized herein, to eventually form the preferred fields 13, 14 described above, for individual adhesive constructions 1. In general, web 73 comprises a web of release liner material which, after appropriate cutting application, will form continuous strip 31, FIG. 2. Web 74, on the other hand, comprises a web of material which, after die cutting, will form the flexible substrates 5 of the various individual adhesive constructions 1.

For the particular embodiment depicted in FIG. 3, flexible web 74 of the roll stock 70 is depicted as a transparent material, allowing viewing of adhesive field 75 and the surface of web 73 thereunder. To facilitate understanding, web 74 is fragmented for viewing web 73, at region 76.

In FIG. 3, the particular roll stock 70 depicted comprises two rows 77 and 78 of spaced adhesive free areas 79, over which two rows of individual adhesive construction 1 will eventually be formed. The phantom line indicated at 80 depicts a cut line which will eventually be made through the release liner stock 73, to separate the rows 77, 78 of roll stock 70 into strips of labels having a single line of labels. Phantom lines 81 indicate where die cutting through the web 74, but not through the release liner stock 73, will take place, in order to generate the individual substrates 5, FIG. 1. The die cutting operation will be described in greater detail, below. The particular roll stock 70 depicted includes narrow adhesive-free strips 82 along each side edge 83, to facilitate handling.

Still referring to FIG. 3, roll stock 70 includes two types of adhesive fields thereon. The first type of adhesive field is indicated generally at 85. A portion of field 85 comprises an adhesive field which, in a final label product, will generate first (perimeter) fields 13, FIG. 1. Thus, the first type of adhesive field 85 preferably comprises adhesive coverage of between 30% and 80% coverage of the surface area defined by its borders 85a and 85b, most preferably coverage as defined for FIG. 1.

The second type of adhesive field is indicated at 86 and, in the final adhesive constructions 1, will form second (internal) fields 14, FIG. 1. Thus, preferably the second type of adhesive field 86 comprises at least 80%, and most preferably continuous adhesive coverage in the regions defined by borders 86a and 86b.

Still referring to FIG. 3, it is again noted that the roll stock 70 includes a plurality of spaced adhesive-free regions 79 in which there is no adhesive between the two webs 73, 74. Regions 79, in the final label roll construction 30, FIG. 2, form unsealed regions 17.

Still referring to FIG. 3, it is noted that all die cut lines 81 are positioned in overlap with adhesive fields 85 of the first type. That is, during the die cutting operation to form the individual constructions, covers, components for labels, the die cutting is preferably through web 74 in overlap with regions where, between the web 74 and the web 73, there is positioned adhesive field 85 of the first type. As a result, the die cutting operation avoids die cuts in regions in which there is a higher percentage of adhesive such as is found in adhesive fields of the second type.

By the term "overlap" in this context, it is meant that the strike of the die cut from the viewpoint of FIG. 3 through web 74 in a portion directly above region 85.

After the die cutting operation, once waste material from web 74 is stripped away, the resulting adhesive constructions 1 or covers 33, FIG. 2, will have a perimeter edge along which there is a perimeter adhesive field of the type indicated at 13, FIG. 1. It is noted that in general, the material selected for the adhesive, the release liner 73 and the substrate web 74 will be such that adherence of the adhesive to the substrate 74 material is greater than the adherence of the adhesive to the release liner 73. One result of this is that when waste or scrap material from web 74 is stripped away after die cutting, the regions of release liner 73 which remain and which are not covered by the individual die cut adhesive constructions 1, are adhesive-free.

In a typical cutting operation, then, die cutting to form individual adhesive construction, occurs in the regions indicated at lines 81 to define a die cut pattern or perimeter pattern circumscribing individual labels or covers. The resulting waste material between adhesive construction or covers is stripped from the roll stock 70, leaving continuous web 73 intact with a plurality of spaced adhesive constructions 1 is secured thereto. Web 73 can be cut, into strips, by cutting along line 80 between the rows of adhesive constructions, to result in two one lane roll constructions 30 each of which is as shown in FIG. 2. This final cutting operation, to form the individual rolls 30, would be through adhesive-free regions as a result of the stripping of waste material of layer 74 from layer 73, after die cutting.

In general, roll stock 70 in accord with FIG. 3, is readily manufactured by a process of applying an appropriate adhesive pattern to one of the two webs 73, 74, and then bringing the two webs together in a continuous operation. Various methods can be utilized to apply the adhesive, typically dot or spot printing being preferred. With dot or spot printing, variations in the amount of adhesive applied in various locations, to generate the two types of adhesive fields 85, 86 characterized, can be readily conducted. In a typical operation, the adhesive is applied in a dot or spot pattern on one or the other of the two webs 73, 74, prior to the webs being brought together to form the laminate 70. A transfer printing process can be utilized.

When the webs are brought together, typically they are squeezed together in a nip or bite between rollers. In a typical printing operation, a higher concentration of dots or spots is placed in a region which will become the inner portion 14, with a continuous adhesive pattern. Even though the spots in this region may be created in an isolated continuous pattern, as a result of the squeezing process the spots in this region will spread and join with one another, to form the continuous pattern. In the region which will become the first (outer perimeter) adhesive pattern 13, however, typically the spot pattern is sufficiently low in population, so that even after the squeezing operation a discontinuous pattern of adhesive still results. This can be readily accomplished by using 30%–60% (by wt.) of adhesive, per unit area, of adhesive for the region to become the discontinuous pattern, than is used in the region to become the continuous pattern. Typically, dots applied at 20–100 dots/inch, will be convenient to generate such patterns. A usable printing process is screen printing using a screen at 50 lines/inch, with half tone printing for pattern 13, and full tone for pattern 14.

In general, for the preferred arrangements of FIGS. 1–3, the adhesive patterns are defined with respect to perimeter patterns and inner patterns. It is noted that in general the principles relate to application of at least two different patterns of adhesives on a substrate, generally referenced as a first pattern and as a second pattern. The first pattern would in general define at least 10 sq. mm. (typically at least 30 sq. mm.) of area with a discontinuous adhesive pattern covering no more than 80% of the defined area, preferably of no more than 70%; and, the second adhesive area would define at least 10 sq. mm. (typically at least 30 sq. mm.) with adhesive covering at least 80%, preferably at least 90%, typically at least 95% with adhesive, most preferably in a continuous pattern covering at least 99.5% of the area. For such arrangements, preferably the second area of adhesive comprises at least 30%, per unit area, more adhesive than is found in the first adhesive region. Of course, in preferred constructions such as those described, the first adhesive region is a perimeter adhesive region and the second adhesive region is an inner adhesive region. However, from the example provided, it will be understood that alternate arrangements of the two adhesive patterns are available, and, indeed, there may be still further adhesive regions provided on the substrate. In addition, the first adhesive region could be broken into more than one separate area, each of which has a minimum area of at least 10 sq. mm.; and/or the second region could be broken into more than one region, each of which has a minimum area of at least 10 sq. mm.

Preferred Materials

A variety of materials can be utilized in arrangements according to the present invention. Typical preferred materials would be as follows:

(1) for the label substrate, a usable material is, for example, clear 2 mm. biaxially oriented polypropylene (BOPP), for example, as available from a variety of films companies such as Armstrong Specialty Films, Inc., Mukwongo, Wis., 53149;

(2) for the release liner, a utilizable material is 43 pound diversified Kraft paper with a silicone release coating, such as is available from the Siltech Division of Technicote, Co., Miamisburg, Ohio 45342.

(3) for the pressure sensitive adhesive a variety of commercially available pressure sensitive adhesives can be used, with the specific choice generally being dependent upon the desired conditions of application. Usable pressure sensitive adhesives are available, for example, from H. B. Fuller, St. Paul, Minn.; Ashland Petroleum, Columbus, Ohio 43216; and, Hartland Adhesives of New Berlin, Wis.

Typically, the amount of adhesive applied during the printing operation in the regions that will form the first (perimeter) fields 13, FIG. 1, is about 35–65% (usually 40–60%) of the amount of adhesive applied in the regions which will provide the internal adhesive field 14, FIG. 1. The wt. % given is meant to refer to the weight of adhesive applied per unit area.

Preferred Configurations and Dimensions

While a wide variety of configurations and dimensions may be utilized in arrangements according to the present invention, it is foreseen that in typical applications, the adhesive constructions will be parallelograms, typically rectangles or squares. In general, it is anticipated that in typical preferred constructions the perimeter adhesive fields will be of even width around the perimeter, typically about 1 to 10 mm. wide; and, the internal adhesive field 14 will be a framed construction having an even width around the frame, typically about 10 to 40 mm. wide. It is foreseen that in general, the central region of the label will be a region that has no adhesive thereon, and will typically comprise at least about 30% and generally about 40% to 80% of the total perimeter area of the label or cover; the term "perimeter area" in this context, refers to label area as defined by the outer perimeter of the label or cover.

The above specification, examples and data provide a general description of the manufacture and use of the composition of the invention. Many embodiments of the invention can be made without departing from the spirit and scope of the invention.

What is claimed is:

1. An adhesive construction comprising:

(a) a flexible label substrate having a first side and defining an outer perimeter edge;

(b) a first adhesive field comprising pressure sensitive adhesive and defining an outer perimeter adhesive field positioned on the first side of the flexible label substrate and adjacent the outer perimeter edge, (i) the first adhesive field being a discontinuous pattern of spaced adhesive dots with adhesive covering no more than 70% and at least about 30% of an area of a portion of the first side of the flexible label substrate defined by the first adhesive field, (ii) the area of a portion of the first side of the flexible label substrate defined by the first adhesive being at least 30 sq. mm., (iii) encountering some of the adhesive dots in the first adhesive field; each adhesive dot encountered by the outer perimeter edge being spaced from a next closest adhesive dot encountered by the outer perimeter edge by a distance along the outer perimeter edge of 5 mm. or less, and (iv) the outer perimeter adhesive field having a dimension of extension inwardly from the outer perimeter edge of at least 1 mm.;

(c) a second adhesive field comprising pressure sensitive adhesive and defining an inner adhesive field spaced from the outer perimeter edge and completely surrounded by the first adhesive field, (i) the second adhesive field covering at least 90% of an area of a portion of the first side of the flexible label substrate defined by the second adhesive field,
(ii) the area of a portion of the first side of the flexible label defined by the second adhesive field being at least 30 sq. mm., and
(iii) the inner adhesive field having a dimension of extension inwardly from the outer perimeter adhesive field of at least 3 mm.;
(d) an adhesive-free region on the first side of the flexible substrate completely surrounded by the inner adhesive field,
(i) the adhesive-free region comprising at least 40% of a perimeter area defined by the flexible substrate outer perimeter edge, and
(ii) the adhesive-free region of the flexible substrate being transparent; and
(e) wherein the first adhesive field and second adhesive field are applied in a single screen-printing process.

2. An adhesive construction according to claim 1 including:
(a) a release liner to which the flexible substrate is secured by the first adhesive field and the second adhesive field.

3. An adhesive construction according to claim 1 wherein:
(a) the inner adhesive field comprises a continuous adhesive field over the area of the portion of the first side of the flexible substrate defined by the inner adhesive field.

4. The adhesive construction according to claim 1 wherein:
(a) the amount of adhesive application in the inner adhesive field on a per unit basis is about 1.5 to 2.5 times the amount of adhesive in the outer perimeter adhesive field.

5. The adhesive construction according to claim 4 wherein:
(a) the inner adhesive field comprises a full tone adhesive screen print; and
(b) the outer perimeter adhesive field comprises a half tone adhesive screen print.

6. The adhesive construction of claim 1 wherein:
(a) the outer perimeter edge defines a rectangular pattern;
(b) the outer perimeter adhesive field defines a rectangular frame; and
(c) the inner adhesive field defines a rectangular frame.

* * * * *

UNITED STATES PATENT AND TRADEMARK OFFICE
CERTIFICATE OF CORRECTION

PATENT NO. : 6,730,396 B2
DATED : May 4, 2004
INVENTOR(S) : Maloney

It is certified that error appears in the above-identified patent and that said Letters Patent is hereby corrected as shown below:

Column 1,
Line 19, "liner, During" should read -- liner. During --.

Column 10,
Line 55, "(iii) encountering" should read -- (iii) the outer perimeter edge encountering --.

Signed and Sealed this

Twenty-seventh Day of December, 2005

JON W. DUDAS
*Director of the United States Patent and Trademark Office*